(12) United States Patent
Ezhov et al.

(10) Patent No.: US 9,680,685 B2
(45) Date of Patent: Jun. 13, 2017

(54) SYSTEM AND METHOD FOR MANAGING VIDEO CONTENT FEEDS

(71) Applicant: SPB TV AG, Zug (CH)

(72) Inventors: Fedor Sergeevitch Ezhov, Zug (CH); Nikolay Viktorovitch Krasko, Zug (CH)

(73) Assignee: SPB TV AG, Zug (CH)

( * ) Notice: Subject to any disclaimer, the term of this patent is extended or adjusted under 35 U.S.C. 154(b) by 200 days.

(21) Appl. No.: 14/272,799

(22) Filed: May 8, 2014

(65) Prior Publication Data

US 2015/0326868 A1 Nov. 12, 2015

(51) Int. Cl.
| G06F 15/16 | (2006.01) |
| H04L 29/06 | (2006.01) |
| H04N 19/40 | (2014.01) |
| H04L 29/08 | (2006.01) |
| H04N 21/00 | (2011.01) |
| H04N 21/2343 | (2011.01) |
| H04N 21/6373 | (2011.01) |
| H04N 21/647 | (2011.01) |

(52) U.S. Cl.
CPC .............. *H04L 29/06* (2013.01); *H04L 29/08* (2013.01); *H04L 65/607* (2013.01); *H04L 65/608* (2013.01); *H04L 67/10* (2013.01); *H04N 19/40* (2014.11); *H04N 21/00* (2013.01); *H04N 21/2343* (2013.01); *H04N 21/23439* (2013.01); *H04N 21/6373* (2013.01); *H04N 21/64761* (2013.01)

(58) Field of Classification Search
CPC ..... H04N 19/40; H04L 65/608; H04L 65/607; H04L 67/10; G06F 11/10
USPC .................................................. 709/231, 209
See application file for complete search history.

(56) References Cited

U.S. PATENT DOCUMENTS

| 8,204,206 B2* | 6/2012 | Townsend ........... H04M 3/5237 379/220.01 |
| 8,655,985 B2* | 2/2014 | De ...................... H04L 12/5689 709/202 |

(Continued)

*Primary Examiner* — Melvin H Pollack
(74) *Attorney, Agent, or Firm* — BCF LLP

(57) ABSTRACT

There is disclosed a method of distributing streamed content in a network, the network having a central server and at least a first node and a second node communicatively coupled to the central server, the streamed content transcoded at the central server as a first transcoded stream and a second transcoded stream, the first transcoded stream and the second transcoded stream being different in at least a bitrate used for transcoding. The method is executable at the central server. The method comprises receiving from a client device, via the network, a request for a portion of the streamed content, the request including an indication of an operational parameter associated with the client device; determining one of the first node and the second node best suited to deliver content to the client device; based on the indication of the operational parameter, determining one of the first transcoded stream and the second transcoded stream best suited for the client device; transmitting to the client device a connection signal, the connection signal including identification of (i) the one of the first node and the second node and (ii) the indication of the one of the of the first transcoded stream and the second transcoded stream.

22 Claims, 2 Drawing Sheets

(56) References Cited

U.S. PATENT DOCUMENTS

| | | | |
|---|---|---|---|
| 8,656,442 B1* | 2/2014 | Clarke | H04L 65/605 709/203 |
| 8,683,066 B2* | 3/2014 | Hurst | H04N 21/23439 709/231 |
| 8,745,160 B2* | 6/2014 | Gautier | G06F 17/30896 707/999.001 |
| 2011/0099449 A1* | 4/2011 | Li | H04L 1/0041 714/752 |
| 2012/0124132 A1* | 5/2012 | Gautier | G06F 17/30896 709/203 |
| 2013/0166768 A1* | 6/2013 | Gouache | H04L 65/00 709/231 |
| 2014/0189762 A1* | 7/2014 | Hainline | H04N 7/17318 725/93 |

* cited by examiner

SYSTEM AND METHOD FOR MANAGING VIDEO CONTENT FEEDS

CROSS-REFERENCE

None.

FIELD

The present technology relates to video content feeds in general and specifically to a system and method for managing video content feeds.

BACKGROUND

With advances in both the computer technology and the available bandwidth of users' Internet connections, streaming media became a common place. From watching a video on the YouTube™ service, to listening streaming music, to watching the latest episode of a favourite day time soap opera—are all examples of users streaming content to their electronic devices—be it laptops, desktops, tablets or smartphones. With the processing power of these electronic devices, combined with the available bandwidth of either home/work or wireless networks, users can stream the content virtually everywhere.

Having said that, it is well recognized in the industry that, even with all the advances in the telecommunication network and the available bandwidth, the available bandwidth in the Internet can vary widely. Not only between different countries (for example, available bandwidth can vary greatly between developed countries and the developing countries), but also within the same country (compare, for example, urban vs. rural areas).

Even within the boundaries of the same neighbourhood, different households may have subscribed to different service providers' packages (for example, for the sake of a cheaper package and the associated monthly subscription fee or the like) and, as such, may have different download/upload bandwidth available to them.

Furthermore, for those users using smartphones on the wireless networks for the purposes of streaming media content to their electronic devices (i.e. smartphones), the comparatively limited bandwidth and comparatively limited coverage of the wireless networks, as well as wireless interference can cause large fluctuations in available bandwidth. In those circumstances, when congestion occurs (or even without congestion), bandwidth can degrade quickly. For streaming media, which require long lived and stable connections, fluctuations in available bandwidth can be detrimental for the quality of the user experience.

Within the prior art solutions for media streaming, it is known to deliver video streams using Real Time Streaming Protocol (RTSP) through a Content Delivery Network (CDN). CDN technology is widely used nowadays since it allows for redistributing traffic across multiple edge nodes to prevent bottlenecks, reducing time of delivery of content to a client and reducing bandwidth costs.

Generally speaking, a typical prior art CDN consists of multiple nodes that can provide content to electronic devices associated with the various users with the streamed media. When a particular electronic device associated with a particular user tries to connect to a CDN, the connection is established to a node that has the most appropriate characteristic for the particular electronic device. For example, it is known that the most appropriate characteristic of the node so selected can be, for example, the node that is geographically closest to the location of the electronic device. Alternatively, the most appropriate characteristic of the node so selected may be the node with the lowest latency and the like.

As a result of the known CDN architecture, the electronic device associated with the particular user establishes a faster and/or more reliable connection than it could be in the case of a randomly selected node within the CDN. Further, the usage of CDN is usually transparent to the electronic device, and there is no need to use any hardware nor software nor applications on the electronic device side. Particularly, a convenient web browser can use CDNs 'out of the box'. U.S. Pat. No. 7,299,291 describes an example of such prior art CDN technology.

Within the prior art solutions, an RTSP protocol (described in RFC 2326) is used for establishing and controlling media sessions between end points (such as, for example, between the server or the node in the CDN and the electronic device associated with the user). The RTSP protocol provides a set of commands to control a playback of media content that is being delivered in real time from the server to the electronic device.

The RTSP protocol allows inter alia getting a description of the media content, setting up a specific media stream, starting and pausing the delivery of the media, etc. The aforementioned U.S. Pat. No. 7,299,291 describes how RTSP protocol can be used to access content through CDN.

SUMMARY

It is an object of the present technology to ameliorate at least some of the inconveniences present in the prior art.

More specifically, embodiments of the present technology have been developed based on inventors' appreciation of at least one drawback or an area of improvement associated with the prior art solutions. Inventors have appreciated that a disadvantage of the known CDN solutions is that a respective electronic device associated with a respective user of a given CDN system receives the same quality (bitrate, codec, fps, etc.) stream for content from all CDN nodes, as well as the same quality (in theory) as any other electronic device associated with any other user of the same given CDN system.

When the electronic device connects to a given node and starts streaming, parameters of the stream remain constant. However, it may not be inappropriate in some circumstance (whether from the get-go of the streaming or, perhaps, over time as circumstances change).

For example, if the electronic device associated with a user downloads the media stream using a 3G network, the quality of connection may change significantly over time. As a result, the electronic device associated with the user may be no longer able to receive the stream in an appropriate quality, as the result of the detrimental changes in the connection quality.

Further, within the presently known CDN solutions, there are no means to maintain a consistent quality of a media stream that each node within the CDN has. In case of TV streaming, for example, CDN usually receives the stream from one source, i.e. a content provider, and the concern is—how to distribute the stream between various nodes within the CDN. One possible solution can be to receive the stream at each node from the content provider. The main disadvantage of this approach is that if a node is far from the content provider, the download of the stream may be inacceptably slow or some packets could be lost. In order to guarantee the download speed and consistency of the content it is possible to establish a dedicated communication link (such as, a fiber channel, a lambda, and the like) between the content provider and each node; however, this solution can result in a higher operating cost and may be impractical.

Generally speaking, in order to overcome mentioned drawbacks, embodiments of the present technology provide for a Content Deliver Network (CDN) that allows adaptive RTSP streaming. As will be described in greater detail herein below, this means that characteristics of the streamed media content will change in accordance with the current quality of the connection between the user electronic device and a CDN node.

According to a first broad aspect of the present technology, there is provided a method of distributing streamed content in a network, the network having a central server and at least a first node and a second node communicatively coupled to the central server, the streamed content transcoded at the central server as a first transcoded stream and a second transcoded stream, the first transcoded stream and the second transcoded stream being different in at least a bitrate used for transcoding. The method is executable at the central server. The method comprises: receiving from a client device, via the network, a request for a portion of the streamed content, the request including an indication of an operational parameter associated with the client device; determining one of the first node and the second node best suited to deliver content to the client device; based on the indication of the operational parameter, determining one of the first transcoded stream and the second transcoded stream best suited for the client device; transmitting to the client device a connection signal, the connection signal including identification of (i) the one of the first node and the second node and (ii) the indication of the one of the of the first transcoded stream and the second transcoded stream.

In some implementations of the method, the first transcoded stream is transcoded at a first bit rate and the second transcoded stream is transcoded at a second bit rate, wherein the determining one of the first transcoded stream and the second transcoded stream best suited for the client device comprises determining which one of the first bit rate and the second bit rate is better suited for the client device In some implementations of the method, the indication of the operational parameter comprises an indication of a platform of the client device.

In some implementations of the method, the indication of the operational parameter comprises an indication of an operating system of the client device.

In some implementations of the method, the client device is coupled to the network via a communication link and wherein the indication of the operational parameter comprises an indication of a bandwidth of the communication link.

In some implementations of the method, the first transcoded stream is transcoded at a first bit rate and the second transcoded stream is transcoded at a second bit rate, wherein the determining one of the first transcoded stream and the second transcoded stream best suited for the client device comprises determining which one of the first bit rate and the second bit rate is better suited for the bandwidth of the communication link.

In some implementations of the method, the determining one of the first node and the second node is executed based on geographical proximity of the respective one of the first node and the second node to the electronic device.

In some implementations of the method, the method comprises receiving an indication of an updated operational parameter at a point of time after the transmitting.

In some implementations of the method, responsive to the updated operational parameter indicating a need for bit rate change, the method further comprises transmitting to the client device an updated connection signal, the updated connection signal including identification of a different one of the of the first transcoded stream and the second transcoded stream.

In some implementations of the method, the different one of the first transcoded stream and the second transcoded stream is associated with a lower bit rate than the one of the of the first transcoded stream and the second transcoded stream included in the connection signal.

In some implementations of the method, the different one of the first transcoded stream and the second transcoded stream is associated with a higher bit rate than the one of the of the first transcoded stream and the second transcoded stream included in the connection signal.

In some implementations of the method, the method further comprises implementing forward error correction (FEC) after the transmitting.

According to another broad aspect of the present technology, there is provided a server. The server comprises a communication interface for communication with at least a first node and a second node via a communication network; a processor operationally connected with the communication interface, the processor configured to: receive, via the communication interface, a streamed content; transcode the streamed content into a first transcoded stream and a second transcoded stream, the first transcoded stream and the second transcoded stream being different in at least a bitrate used for transcoding, receive from a client device, via the network interface, a request for a portion of the streamed content, the request including an indication of an operational parameter associated with the client device; determine one of the first node and the second node best suited to deliver content to the client device; based on the indication of the operational parameter, determine one of the first transcoded stream and the second transcoded stream best suited for the client device; transmit to the client device a connection signal, the connection signal including identification of (i) the one of the first node and the second node and (ii) the indication of the one of the of the first transcoded stream and the second transcoded stream.

In some implementations of the server, the first transcoded stream is transcoded at a first bit rate and the second transcoded stream is transcoded at a second bit rate, wherein to determine one of the first transcoded stream and the second transcoded stream best suited for the client device, the processor is configured to determine which one of the first bit rate and the second bit rate is better suited for the client device.

In some implementations of the server, the indication of the operational parameter comprises an indication of a platform of the client device.

In some implementations of the server, the indication of the operational parameter comprises an indication of an operating system of the client device.

In some implementations of the server, the client device is coupled to the network via a communication link and wherein the indication of the operational parameter comprises an indication of a bandwidth of the communication link.

In some implementations of the server, the first transcoded stream is transcoded at a first bit rate and the second transcoded stream is transcoded at a second bit rate, wherein to determine one of the first transcoded stream and the second transcoded stream best suited for the client device, the processor is configured to determine which one of the first bit rate and the second bit rate is better suited for the bandwidth of the communication link.

In some implementations of the server, to determine one of the first node and the second node, the processor is configured to determine one of the first node and the second node based on geographical proximity of the respective one of the first node and the second node to the electronic device.

In some implementations of the server, the processor is further configured to receive an indication of an updated operational parameter at a point of time after the transmitting of the connection signal.

In some implementations of the server, responsive to the updated operational parameter indicating a need for bit rate change, the processor is further configured to transmit to the client device an updated connection signal, the updated connection signal including identification of a different one of the of the first transcoded stream and the second transcoded stream.

In some implementations of the server, the different one of the first transcoded stream and the second transcoded stream is associated with a lower bit rate than the one of the of the first transcoded stream and the second transcoded stream included in the connection signal.

In some implementations of the server, the different one of the first transcoded stream and the second transcoded stream is associated with a higher bit rate than the one of the of the first transcoded stream and the second transcoded stream included in the connection signal.

In some implementations of the server, the processor is being further configured to implement forward error correction (FEC) after the transmitting.

In yet another broad aspect of the present technology, there is provided a method of receiving streamed content in a network, the network having a central server and at least a first node and a second node communicatively coupled to the central server, the streamed content transcoded at the central server as a first transcoded stream and a second transcoded stream, the first transcoded stream and the second transcoded stream being different in at least a bitrate used for transcoding, the method executable at a client device, the method comprising: appreciating an operational parameter associated with the client device; transmitting, to the central server via the network, a request for a portion of the streamed content, the request including an indication of the operational parameter associated with the client device; the indication of the operational parameter is for enabling the central server to execute: determining one of the first node and the second node best suited to deliver content to the client device; based on the indication of the operational parameter, determining one of the first transcoded stream and the second transcoded stream best suited for the client device; receiving from the central server, via the network, a connection signal, the connection signal including identification of (i) the one of the first node and the second node and (ii) the indication of the one of the of the first transcoded stream and the second transcoded stream.

In some implementations of the method, the method further comprises connecting to the one of the first node and the second node and requesting one of the of the first transcoded stream and the second transcoded stream.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, "method" described herein can be embodied in machine-readable instructions, which instructions can be executed on the server or a client device (or both) or any multiprogramming or multiprocessing computerized device such as a multiprocessor, controller or dedicated computing device or the like configured with software and/or circuitry (e.g., a processor as summarized above) to process any or all of the method operations disclosed herein as embodiments of the technology. Software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the technology are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the technology.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first node" and "third server" is not intended to imply any particular order, type, chronology, hierarchy or ranking (for example) of/between the server, nor is their use (by itself) intended imply that any "second node" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
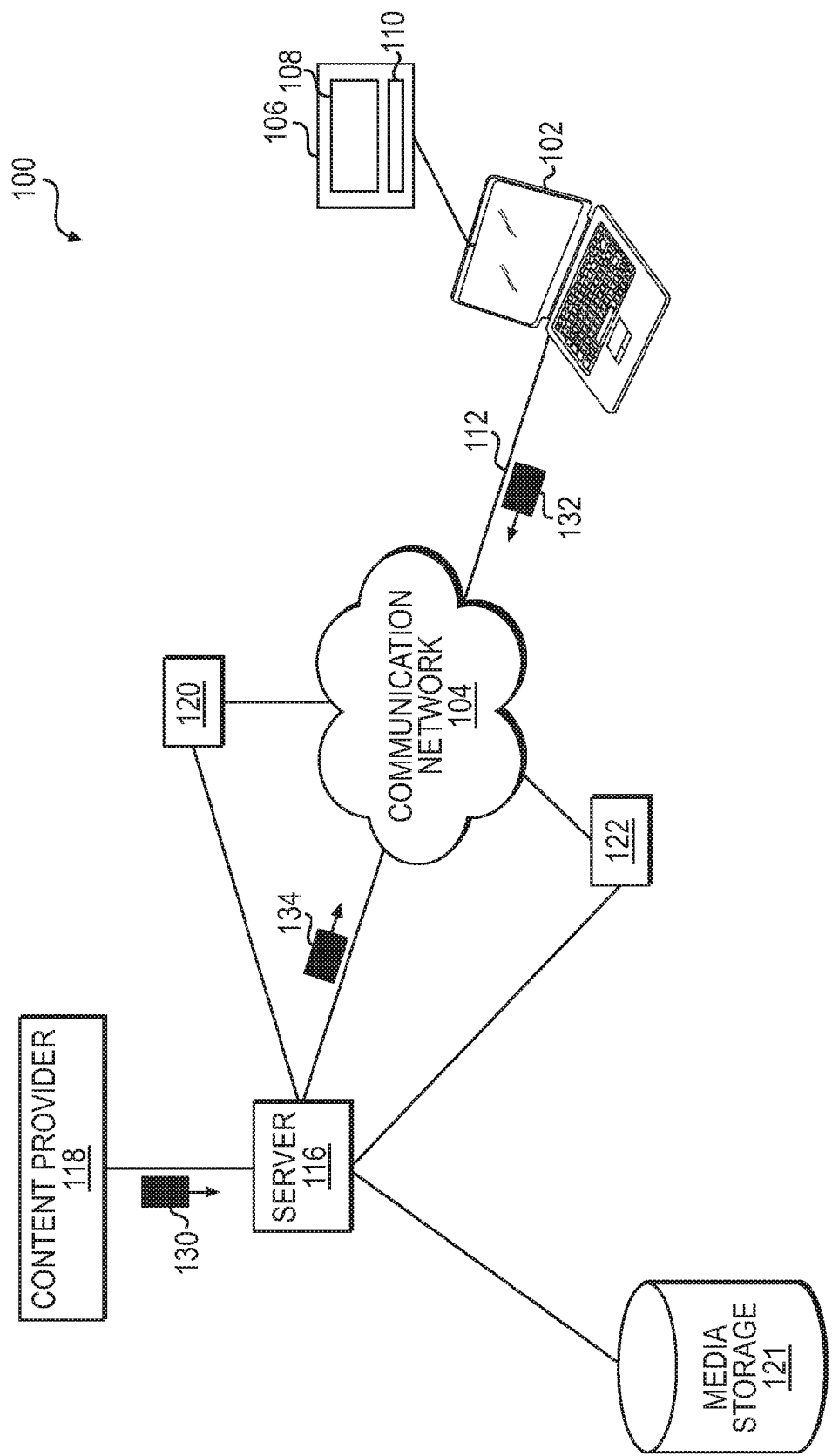
FIG. 1 is a schematic diagram depicting a system 100, the system 100 being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless electronic device (a cell phone, a smartphone, a tablet and the like), as well as network equipment (a router, a switch, or a gateway). In some embodiments of the present technology, the electronic device 102 can be embodied in a set-top box (STB) combined with a TV (or any other type of a monitor). Alternatively, the electronic device 102 can be implemented as a "smart TV". One of skill in the art will appreciate that a typical user may have access to more than one type of the electronic device 102.

The general implementation of the electronic device 102 is known in the art and, as such, will not be described here at much length. Suffice it to say that the electronic device 102 comprises a user input interface (such as a keyboard, a mouse, a touch pad, a touch screen and the like) for receiving user inputs; a user output interface (such as a screen, a touch screen, a printer and the like) for providing visual or audible outputs to the user; a network communication interface (such as a modem, a network card and the like) for two-way communication over a communications network 104; and a processor coupled to the user input interface, the user output interface and the network communication interface, the processor being configured to execute various routines, including those described herein below. To that end the processor may store or have access to computer readable commands which commands, when executed, cause the processor to execute the various routines described herein. In some embodiments of the present technology, the user output interface can be separate from the electronic device 102—for example, a head-warn glasses, a wrist watch and the like.

Irrespective of how the electronic device 102 is implemented, the electronic device 102 comprises hardware and/or software and/or firmware (or a combination thereof), as is known in the art, to execute a streaming media application 106. Generally speaking, the purpose of the streaming media application 106 is to enable the user (not depicted) to view and/or listen to at least one streaming media feed. The streaming media application 106 has a content interface 108 and a command interface 110.

Generally speaking, the purpose of the content interface 108 is to present the streaming media content to the user (such as to show a video or to show an image/animation associated with an audio). The purpose of the command interface 110 is to enable the user (not depicted) to provide one or more commands to actuate the streaming media content. In the example of the streaming media content being a video streaming content, the command interface 110 can comprise well known command actuators (not depicted) to enable the user to start streaming, pause streaming, control the audio level, fast forward and rewind (in cases of a non-live streaming video content), control brightness and the like. Similar implementations of the command interface 110 for other types of streaming media will become apparent to those of skill in the art.

In some non-limiting embodiments of the present technology, the communications network 104 can be implemented as the Internet. In other embodiments of the present technology, the communications network 104 can be implemented differently, such as any wide-area communications network, local-area communications network, a private communications network and the like.

The electronic device 102 is coupled to the communications network 104 via a communication link 112. How the communication link 112 is implemented is not particularly limited and will depend on how the electronic device 102 is implemented. Recalling that the electronic device 102 can be implemented, in this example, as a wireless communication device (such as a smartphone, for example), the communication link 112 can be wireless (such as the Wireless Fidelity, or WiFi® for short, Bluetooth® or the like). In those embodiments, where the electronic device 102 is implemented as a stationary computer or a laptop, the communication link 112 can be either wireless or wired (such as an Ethernet based connection).

The communication link 112 can be associated with a bandwidth limitations—either by design or based on the connection package selected by the user associated with the electronic device 102. For example, a given service provider (not depicted) responsible for the communication link 112 may provide the user of the communication device 102 a selection of download/upload bandwidth combinations. For example, the user may choose between 10 Mbps for download and 1.5 Mbps for upload; 20 Mbps for download and 10 Mbps for upload and the like.

It should be expressly understood that implementations for the electronic device 102, the communication link 112 and the communications network 104 are provided for illustration purposes only. As such, those skilled in the art will easily appreciate other specific implementational details for the electronic device 102, the communication link 112 and the communications network 104. As such, by no means, examples provided herein above are meant to limit the scope of the present technology.

Also coupled to the communications network is a server 116. The server 116 can be implemented as a conventional computer server. In an example of an embodiment of the present technology, the server 116 can be implemented as a Dell™ PowerEdge™ Server running the Microsoft™ Windows Server™ operating system. Needless to say, the server 116 can be implemented in any other suitable hardware and/or software and/or firmware or a combination thereof. In the depicted non-limiting embodiment of present technology, the server 116 is a single server. In alternative non-limiting embodiments of the present technology, the functionality of the server 116 may be distributed and may be implemented via multiple servers.

The implementation of the server 116 is well known. However, briefly speaking, the server 116 comprises a communication interface (not depicted) structured and configured to communicate with various entities (such as the electronic device 102, for example and other devices potentially coupled to the communications network 104) via the communications network 104. The server 116 further comprises at least one computer processor (not depicted) operationally connected with the communication interface and structured and configured to execute various processes to be described herein.

In some embodiments, the server is under control and/or management of a streaming media content provider (not depicted). To that end, the server 116 can be sometimes referred to as a central server 116 in a sense that the server 116 operates or controls a content deliver network (not separately numbered) or CDN, for short. As is known, a CDN is a network of geographically distributed content delivery nodes that are arranged for efficient delivery of digital content (e.g., Web content, streaming media and applications) on behalf of third party content providers (not depicted). To that end, there are also provided a first node 120 and a second node 122. The first node 120 and the second node 122 are operatively coupled to the server 116 via dedicated communications links (not numbered). The first node 120 and the second node 122 are also operatively coupled to the electronic device 102 via the communications network 104.

In some embodiments of the present technology, the server 106, the first node 120 and the second node 122 can implement forward error correction (FEC) technology in the process of delivering the content stream from the server 106 to the first node 120 and the second node 122. Within these embodiments (but not necessarily limited to those embodiments), the quality of streaming between the server 116 and the first node 120 and the second node 122 can be maintained without the need for a dedicated link and, as such, the connection can be executed via the communication network 104. Hence, it can be said that alternatively, the first node 120 and the second node 122 can be operatively coupled to the server 116 via the communications network 104.

It should be expressly understood that the FEC can also be applied to those embodiments, where the server 116, the first node 120 and the second node 122 are communicatively coupled via the respective dedicated communication links, as is the case with the embodiment depicted in FIG. 1.

It should be noted that the first node 120 and the second node 122 are just examples of the plurality of nodes (not depicted) present within the CDN, each of the plurality of the nodes (not depicted) present within the CDN being geographically distributed.

The server 116 is also coupled to a content provider 118. The content provider 118 can be referred to, by those skilled in the art, as a headend. In the depicted embodiment, the server 116 is communicatively coupled to the content provider 118 via a dedicated communication link (not numbered). Alternatively, the server 116 can be communicatively coupled to the content provider 118 via the communications network 104. In some embodiments of the present technology, the content provider 118 can be a source of a live video feed, a pre-recorded video feed, a stored video feed or an audio feed. It should be expressly noted that embodiments of the present technology are not limited to any particular type of streaming media content being delivered from the content provider 118.

The server 116 is configured to receive a streaming media content stream 130 from the content provider 118. In some embodiments of the present technology, the streaming media content stream 130 can be encoded using one of the streaming media formats: RealNetworks RealSystem G2, Microsoft Windows Media Technologies ("WMT"), and Apple QuickTime. RealSystem G2 handles all media types including audio, video, animation, and still images and text. RealSystem G2 and QuickTime support SMIL, an XML-based language that allows the content provider to time and position media within the player window. In some embodiments, the server 116 and the content provider 118 further execute the Real Time Streaming Protocol (RTSP). RTSP is an application-level protocol designed to work with lower-level protocols like RTP (Realtime Transport Protocol) and RSVP (Resource Reservation Protocol) to provide a complete streaming service over the communications network 104, such as the Internet.

The server 116 is further configured to transcode the streaming media content stream 130 into at least two streams—a first transcoded stream and a second transcoded stream, the first transcoded stream and the second transcoded stream having a different characteristic therebetween (and, in some embodiments, different from that of the streaming media content stream 130). To that end, the server 116 is provided, has access to or executes functionality of a transcoder (not depicted).

In some embodiments, the different characteristic of the first transcoded stream and the second transcoded stream is a different bit rate. In some embodiments and as an example only, the streaming media content stream 130 may be encoded at a bit rate of 500 kbps, the server 116 can transcode the streaming media content stream 130 into the first transcoded stream having a bit rate of, say, 350 kbps and the second transcoded stream having a bit rate of, say, 180 kbps. Needless to say, the server 116 can transcribe the streaming media content stream 130 into a number of additional transcoded streams, having other bit rates. It should be expressly understood that the examples of specific bit rate values should be treated as that—purely illustrative examples. Those skilled in the art, having benefits of the teachings of the present disclosure, will be able to easily determine other suitable values for the bitrates, as well as the number of the transcoded streams. Those can be determined by experiments, for examples, depending on the needs of the particular operator of the server 116.

In some embodiments, especially those embodiments where the streaming media content stream 130 is not a live feed, the server 116 is further configured to store the first transcoded stream and the second transcoded stream in a media storage 121. As depicted in FIG. 1, the media storage 121 can be communicatively coupled to the server 116 via a dedicated communication link (not numbered). Alternatively, the media storage 121 can be communicatively coupled to the server 116 via the communications network 104.

In alternative embodiments, especially but not limited to those embodiments where the media content stream 130 is a live feed, the server 116 is further configured to transcode the media content stream 130 into the first transcoded stream and the second transcoded stream substantially in real time (or near real time) without storing the first transcoded stream and the second transcoded stream in a media storage 121.

In some embodiment, the server 116 comprises or has access to a functionality of a splitter (not depicted). The splitter (also referred to sometimes as a repeater, a reflector or a mirror) is configured to replicate one or more of the first transcoded stream or the second transcoded stream and to send it to a respective destination (one or both of the first node 120 and the second node 122).

In some embodiments of the present technology, the functionality of the splitters is implemented in a tree-like fashion, thus allowing, for a single source stream to be replicated into a plurality of identical copies.

In some embodiments of the present technology, the splitter sends all available streams to all available destinations (one or both of the first node 120 and the second node 122). In other embodiments, each of the available destinations (one or both of the first node 120 and the second node 122) requests from the splitter (or the server 116) the required stream.

Let it now be assumed that the user of the electronic device 102 wishes to stream a video content to the electronic device 102. Let it further be assumed that the video content is associated with a non-live feed contained in the streaming media content 130, which has been transcoded into the first transcoded stream and the second transcoded stream and stored in the media storage 121.

The user launches the streaming media application 106 and requests streaming content using the command interface 110. In response, the streaming media application 106 sends a connection request 132 towards the server 116. According to embodiments of the present technology, the connection request 132 containing inter alia (i) an indication of the streaming content being requested; (ii) an identifier of the electronic device 102 and (iii) an indication of an operational parameter associated with the electronic device 102.

In some embodiments, the connection request 132 can be embodied in the "SETUP request" of the RTSP. As is known, the SETUP request is generally for specifying how a single media stream is to be transported. It is also known that the SETUP request needs to be exchanged prior to the PLAY request is sent. Needless to say the connection request 132 can be embodied in any other request submitted under RTSP, such as an OPTIONS request.

The identifier of the electronic device 102 can be its IP address, its MAC address and the like. Those skilled in the art will appreciate that the identifier of the electronic device 102 may include a number of additional/auxiliary identifiers, such as an IP address of an access point (such as a router) associated with the electronic device, a port identifier associated with the access point and the like. The indication of the streaming content requested can be its Unified Resource Locator (URL), its unique identifier, its title and the like.

In some embodiments of the present technology, the indication of the operational parameter associated with the electronic device 102 can be an indication of the operating system of the electronic device 102. Alternatively or additionally, the indication of the operational parameter associated with the electronic device 102 can be an indication of the platform on which the electronic device 102 is built. Alternatively or additionally, the indication of the operational parameter associated with the electronic device 102 can be an indication of the connection bandwidth associated with the communication link 112. Alternatively or additionally, the indication of the operational parameter associated with the electronic device 102 can be an indication of a parameter associated with a hardware portion of the electronic device 102, such as, for example, resolution of the screen or a characteristic of speakers associated with the electronic device 102 and the like.

Naturally, the indication of the operational parameter can include a mix of the above examples, as well as other potential operational parameters of the electronic device 102 in addition or instead of some or all of the examples provided above.

For the illustrative purposes of the description to be presented below, let us assume that the indication of the operational parameter includes inter alia that the electronic device uses Android operating system, Version 2.3 (i.e. the Android 2.3 (Gingerbread) SDK released on Dec. 6, 2010). Let it also be assumed that the operational parameter includes a then current bandwidth limitation associated with the communication link 112.

The server 116 receives the connection request 132 and examines its content. Based on the content of the connection request 132, namely the identifier of the streaming content being requested, the server 116 first determines which streaming media content the user has requested. For the purposes of the example being presented herein, it shall be assumed that the server 116 has identified the requested streaming media content to be the content of the streaming media content stream 130.

Based on the content of the connection request 132, namely on the identifier of the electronic device 102, the server 116 further determines one of the first node 120 and the second node 122 (or any other edge nodes potentially present within the system 100) best suited to deliver requested content to the electronic device.

For example, the server 116 can select one of the first node 120 and the second node 122 (or any other edge nodes potentially present within the system 100) based on their physical proximity to the electronic device 102 (location of the electronic device 102 can be inferred from its IP address or, otherwise, be included into or inferred from the connection request 132). The server 116 can further determine a server identifier (such as an IP address or the like) of the best selected one of the first node 120 and the second node 122 (or any other edge nodes potentially present within the system 100). This server identifier can be stored in an internal memory of the server 116, same or different from the media storage 121.

The server 116 is further configured to determine a type of streaming media feed (or, simply, stream) that the electronic device 102 should be provided with in response to the connection request 132. Recalling that the server 116 has stored (or otherwise has available) the first transcoded stream and the second transcoded stream, both representative of the streaming media content stream 130, but having been transcoded at least different bit rates, the "type of stream" as used herein is meant to denote which one of the first transcoded stream and the second transcoded stream should be delivered to the electronic device 102.

More specifically, based on the indication of the operational parameter, the server 116 is configured to determine which one of the first transcoded stream and the second transcoded stream is best suited for the electronic device 102. According to embodiments of the present technology, best suited parameter of the first transcoded stream and the second transcoded stream used for selection thereof may be implemented as the best suited bit rate for the electronic device 102, given its operational parameter.

The server 116 is further configured to transmit to the electronic device 102 a connection signal 134, the connection signal 134 including identification of (i) the one of the first node 120 and the second node 122 so-selected and (ii) one of the of the first transcoded stream and the second transcoded stream so-selected. The indication of the one of the first node 120 and the second node 122 so-selected can be embodied in a respective IP address or any other suitable network identifier for reaching the selected one of the first node 120 and the second node 122 via the communications network 104. The indication of the one of the of the first transcoded stream and the second transcoded stream so-selected can be embodied in an appropriate stream identifier, such as an URL and the like.

Upon receiving of the connection signal 134, the electronic device 102 is, therefore, configured to access the respective one of the selected first node 120 and the second node 122 (as indicated in the connection signal 134) and to the request the respective one of the selected first transcribed stream and the second transcribed stream from the respective one of the selected first node 120 and the second node 122.

In some embodiments of the present technology, in order to maintain a quality of the streaming content, the electronic device 102 may be configured to adaptively control the content stream to the current network conditions (such as, bandwidth, latency and packet losses) both between (i) the electronic device and the respectively selected the respective one of the selected first node 120 and the second node 122 and (ii) the respective one of the respective one of the selected first node 120 and the second node 122 and the server 116.

Recalling that the server 116 and the first node 120/second node 122 can implement the FEC protocol, the server 116 (or the first node 120/second node 122) can insert, as part of the first transcoded stream and the second transcoded stream, a special error correction code. The special error correction code allows electronic device 102 receiving the respective one of the first transcoded stream and the second transcoded stream to correct potential transmission errors without the need for retransmission. The different FEC algorithms could be used, such as for example FEC ¾ where for each three bits of data, there is one error correction bit. That in turns means, that is one of the three data bits are lost, the scenario can be rectified using the one correction bit.

Those skilled in the art will appreciate that the number of errors usually depends on the physical "length" of the communication link and stream bandwidth and routes in the communication network 104. Hence, the number of errors can change over time. In some embodiments of the present technology, a given one of the first node 120 and the second node 122 can block delivery of "higher quality streams" (i.e. those ones of the first transcoded stream and the second transcoded stream having a higher bitrate, for example) to the electronic device 102 (or other electronic devices potentially receiving the same higher quality stream) and thereafter stop pulling them from server 116 in case of inability to correct lost data using FEC (i.e. switched to the one of the first transcoded stream and the second transcoded stream with the lower bit rate).

A particular technical advantage associated with these non-limiting embodiments of the present technology includes ability to allow preventing bottleneck between the given one of the first node 120 and the second node 122 and the server 116 (by means of switching to a lower bitrate stream). Thus, embodiments of the present technology may allow for delivering streamed content to the electronic device 120 in the best available quality at the current moment and within the current network conditions.

To achieve this, in some embodiments of the present technology, the electronic device 102 can send to the server 116 an indication of an updated operational parameter associated with the electronic device, much akin to the connection request 132. The indication of the updated operational parameter may include an indication of the updated/ current operational parameter (such as current updated bandwidth) associated with the electronic device 102.

In response to the receipt of the indication of the updated operational parameter and, upon appreciation that a change is required or warranted, the server 116 can cause the respective one of the first node 120 and the second node 122 to cease pulling of higher bitrate streams (i.e. the higher bit-rated one of the first transcoded stream and the second transcoded stream) from the server 116 in case the updated operational parameter is indicative that the electronic device 102 is not able to receive those high bitrate streams (for example, due to frame drops or performance issues associated with the electronic device 120), thus indicating a need for a change in the bit rate.

These measures can help to reduce the cost of bandwidth, prevent network fluctuations and allow electronic device 102 to receive streamed media content at the maximum possible speed and therefore to improve user experience.

Figure 2:
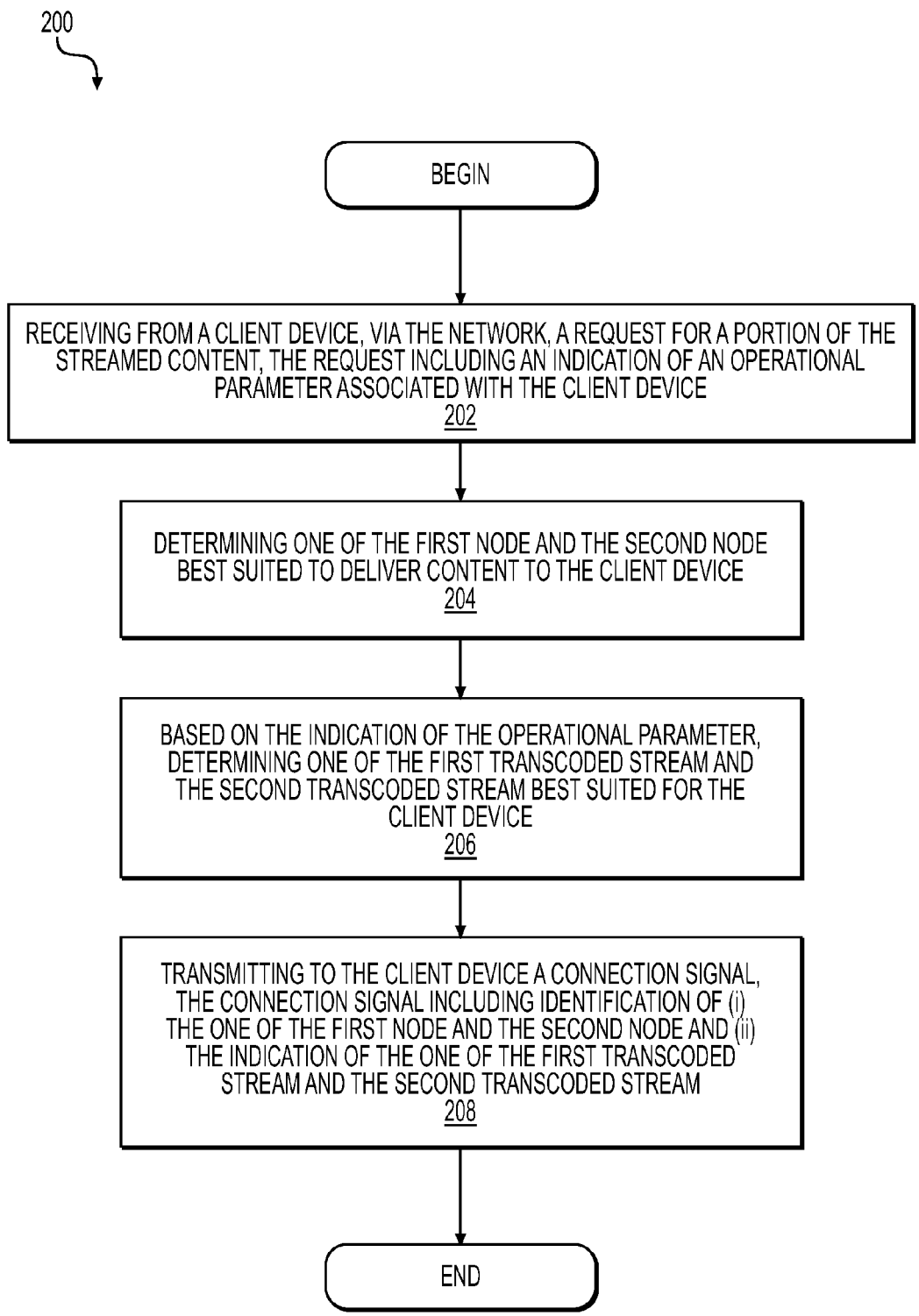
FIG. 2 depicts a flow chart of a method 200, the method 200 being executable at a server of the system 100 of FIG. 1, the method 200 being implemented in accordance with non-limiting embodiments of the present technology.

Given the architecture of the system 100 described with reference to FIG. 1, it is possible to execute a method of streaming content. With reference to FIG. 2, there is depicted a method 200, the method 200 being implemented in accordance with a non-limiting embodiment of the present technology. Within the embodiments of the present technology, the method 200 can be conveniently executed at the server 116. To that extent, the server 116 comprises non-transient computer readable medium containing computer executable instructions, which instructions when executed are configured to cause the server 116 to execute the steps of the method 200.

Step 202—Receiving from a Client Device, Via a Network, a Request for a Portion of the Streamed Content, the Request Including an Indication of an Operational Parameter Associated with the Client Device At stem 202, as part of executing the method 200, the server 116 receives from the electronic device 102, via the communication network 104, a request (such as the aforementioned connection request 132) for a portion of the streamed content, the request including an indication of an operational parameter associated with the electronic device.

As has been described above, according to embodiments of the present technology, the connection request 132 contains inter alia (i) an indication of the streaming content being requested; (ii) an identifier of the electronic device 102 and (iii) an indication of an operational parameter associated with the electronic device 102.

The method 200 then proceeds to execution of step 204.

Step 204—Determining One of the First Node and the Second Node Best Suited to Deliver Content to the Client Device Next, at step 204, the server 116 determines one of the first node 120 and the second node 122 best suited to deliver content to the electronic device 102.

In some embodiments, as part of executing step 204, the server 116 determines which one of the first node 120 and the second node 122 is geographically closest to a location of the electronic device 102. Alternatively, as part of executing step 204, the server 116 may determine which one of the first node 120 and the second node 122 is associated with lower latency and or packet drop rate. Naturally, those skilled in the art will appreciate a number of additional or alternative parameters for the server 116 to determine which one of the first node 120 and the second node 122 is better suited for serving the electronic device 102.

The method 200 then proceeds to execution of step 206.

Step 206—Based on the Indication of the Operational Parameter, Determining One of the First Transcoded Stream and the Second Transcoded Stream Best Suited for the Client Device Next, at step 206, the server 116, based on the indication of the operational parameter, determines one of the first transcoded stream and the second transcoded stream best suited for the electronic device 102.

It should be recalled that the server 116 has stored (or otherwise has available) the first transcoded stream and the second transcoded stream, both representative of the streaming media content stream 130, but having been transcoded inter alia using different bitrates, as an example. Hence, the server 116 can be configured to determine, based on the operational parameter of the electronic device 102, which bit rate of the first transcoded stream and the second transcoded stream is better suited to the electronic device 102. Effectively, based on the operational parameter of the electronic device 102, the server 116 determines which one of the first transcoded stream and the second transcoded stream should be delivered to the electronic device 102.

Further recalling that the operational parameter can be indicative of such characteristics of the electronic device 102 as: operating system, platform, connection bandwidth, resolution of a screen and the like, those skilled in the art will easily appreciate algorithms to match the bitrates of the first transcoded stream and the second transcoded stream to one or more characteristics of the electronic device 102 that the operational parameter received as part of the connection request 132 is representative of.

The method 200 then proceeds to step 208.

Step 208—Transmitting to the Client Device a Connection Signal, the Connection Signal Including Identification of (i) the One of the First Node and the Second Node and (ii) the Indication of the One of the of the First Transcoded Stream and the Second Transcoded Stream Next, at step 208, the server 116 transmits to the client device a connection signal, the connection signal including identification of (i) the one of the first node 120 and the second node 122 and (ii) the indication of the one of the of the first transcoded stream and the second transcoded stream.

The indication of the one of the first node 120 and the second node 122 so-selected can be embodied in a respective IP address or any other suitable network identifier for reaching the selected one of the first node 120 and the second node 122 via the communications network 104. The indication of the one of the of the first transcoded stream and the second transcoded stream so-selected can be embodied in an appropriate stream identifier, such as an URL and the like.

In various non limiting embodiments of the present technology, the method 200 can have the following specific implementation details.

In some implementations of the method 200, the indication of the operational parameter received in step 202, includes an indication of a platform of the electronic device 102. In other implementations, the indication of the operational parameter includes an indication of an operating system of the electronic device 102. In yet further implementations and recalling that the electronic device 102 is coupled to the communications network 104 via the communication link 112, the indication of the operational parameter includes an indication of a bandwidth of the communication link 112.

In some implementations of the method 200, the first transcoded stream is transcoded at a first bit rate and the second transcoded stream is transcoded at a second bit rate, and determining of one of the first transcoded stream and the second transcoded stream best suited for the electronic device 102 includes determining which one of the first bit rate and the second bit rate is better suited for the bandwidth of the communication link 112.

In some implementations of the method 200, determining one of the first node 120 and the second node 120 is executed based on geographical proximity of the respective one of the first node 120 and the second node 120 to the electronic device 102.

In some implementations of the method 200, an additional step executed, whereby the server 116 receives an indication of an updated operational parameter at a point of time after the electronic device 102 has started receiving the selected one of the first transcoded stream and the second transcoded stream. In some embodiments of the method 200, responsive to the updated operational parameter indicating a need for a change, the method 200 further includes a step of transmitting to the electronic device 102 an updated connection signal (similar to the connection signal 134), the updated connection signal including identification of a different one of the of the first transcoded stream and the second transcoded stream.

In some of these implementations, the different one of the first transcoded stream and the second transcoded stream is associated with a lower bit rate than the one of the of the first transcoded stream and the second transcoded stream included in the connection signal 136 transmitted as part of step 208.

In some embodiments of the present technology, given the architecture of the system 100 described with reference to FIG. 1, it is possible to execute a method of receiving streamed content in a network. Within the embodiments of the present technology, the method of receiving the streamed content can be conveniently executed at the electronic device 102. To that extent, the electronic device 102 comprises non-transient computer readable medium containing computer executable instructions, which instructions when executed are configured to cause the electronic device 102 to execute the steps of the method for receiving the streamed content.

The method for receiving streamed content mimics implementations of the method 200 described above from the electronic device 102 perspective and, as such, will not be described here at much length.

Suffice it to say that the electronic device 102 is configured to execute the method of receiving streamed content in a network, the network having a central server 116 and at least a first node 120 and a second node 122 communicatively coupled to the central server 116, the streamed content transcoded at the central server 116 as a first transcoded stream and a second transcoded stream, the first transcoded stream and the second transcoded stream being different in at least a bitrate used for transcoding, the method executable at a client device. The method comprises: appreciating an operational parameter associated with the client device 102; transmitting, to the central server 116 via the network, a request for a portion of the streamed content, the request including an indication of the operational parameter associated with the client device 102; the indication of the operational parameter is for enabling the central server 116 to execute: determining one of the first node 120 and the second node 122 best suited to deliver content to the client device 102; based on the indication of the operational parameter, determining one of the first transcoded stream and the second transcoded stream best suited for the client device 102; receiving from the central server 116, via the network, a connection signal, the connection signal including identification of (i) the one of the first node 120 and the second node 122 and (ii) the indication of the one of the of the first transcoded stream and the second transcoded stream.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of distributing streamed content in a network, the network having a central server and at least a first node and a second node communicatively coupled to the central server, the method executable at the central server, the method comprising:
   transcoding, by the central server, the streamed content into a first transcoded stream and a second transcoded stream, the first transcoded stream and the second transcoded stream being different in at least a bitrate used for transcoding, the first transcoded stream being transcoded at a first bit rate and the second transcoded stream being transcoded at a second bit rate;
   replicating, by the central server, the first transcoded stream and the second transcoded stream such that both the first transcoded stream and the second transcoded stream are available at each one of the first node and the second node;
   receiving from a client device, via the network, a request for a portion of the streamed content, the request including an indication of an operational parameter associated with the client device;
   performing an analysis of the first node and the second node to determine one of the first node and the second node best suited to deliver content to the client device;
   based on the indication of the operational parameter, determining one of the first transcoded stream and the second transcoded stream best suited for the client device, the determining comprising determining which one of the first bit rate and the second bit rate is better suited for the client device;
   transmitting to the client device a connection signal, the connection signal including identification of (i) the one of the first node and the second node and (ii) the indication of the one of the of the first transcoded stream and the second transcoded stream, the connection signal for causing the client device to connect to the one of the first node and the second node and to request from the one of the first node and the second node the one of the of the first transcoded stream and the second transcoded stream.

2. The method of claim 1, wherein the indication of the operational parameter comprises an indication of a platform of the client device.

3. The method of claim 1, wherein the indication of the operational parameter comprises an indication of an operating system of the client device.

4. The method of claim 1, the client device being coupled to the network via a communication link and wherein the indication of the operational parameter comprises an indication of a bandwidth of the communication link.

5. The method of claim 4, wherein the determining one of the first transcoded stream and the second transcoded stream best suited for the client device comprises determining which one of the first bit rate and the second bit rate is better suited for the bandwidth of the communication link.

6. The method of claim 1, wherein the determining one of the first node and the second node is executed based on geographical proximity of the respective one of the first node and the second node to the electronic device.

7. The method of claim 1, further comprising receiving an indication of an updated operational parameter at a point of time after the transmitting.

8. The method of claim 7, responsive to the updated operational parameter indicating a need for bit rate change, transmitting to the client device an updated connection signal, the updated connection signal including identification of a different one of the of the first transcoded stream and the second transcoded stream.

9. The method of claim 8, wherein the different one of the first transcoded stream and the second transcoded stream is associated with a lower bit rate than the one of the of the first transcoded stream and the second transcoded stream included in the connection signal.

10. The method of claim 8, wherein the different one of the first transcoded stream and the second transcoded stream is associated with a higher bit rate than the one of the of the first transcoded stream and the second transcoded stream included in the connection signal.

11. The method of claim 1, the method further comprising implementing forward error correction (FEC) after the transmitting.

12. A server comprising:
a communication interface for communication with at least a first node and a second node via a communication network;
a processor operationally connected with the communication interface, the processor configured to:
receive, via the communication interface, a streamed content;
transcode the streamed content into a first transcoded stream and a second transcoded stream, the first transcoded stream and the second transcoded stream being different in at least a bitrate used for transcoding, the first transcoded stream being transcoded at a first bit rate and the second transcoded stream being transcoded at a second bit rate,
replicate the first transcoded stream and the second transcoded stream such that both the first transcoded stream and the second transcoded stream are available at each one of the first node and the second node;
receive from a client device, via the network interface, a request for a portion of the streamed content, the request including an indication of an operational parameter associated with the client device;
performe an analysis of the first node and the second node to determine one of the first node and the second node best suited to deliver content to the client device;
based on the indication of the operational parameter, determine one of the first transcoded stream and the second transcoded stream best suited for the client device by determining comprising determining which one of the first bit rate and the second bit rate is better suited for the client device;
transmit to the client device a connection signal, the connection signal including identification of (i) the one of the first node and the second node and (ii) the indication of the one of the of the first transcoded stream and the second transcoded stream, the connection signal for causing the client device to connect to the one of the first node and the second node and to request from the one of the first node and the second node the one of the of the first transcoded stream and the second transcoded stream.

13. The server of claim 12, wherein the indication of the operational parameter comprises an indication of a platform of the client device.

14. The server of claim 12, wherein the indication of the operational parameter comprises an indication of an operating system of the client device.

15. The server of claim 12, the client device being coupled to the network via a communication link and wherein the indication of the operational parameter comprises an indication of a bandwidth of the communication link.

16. The server of claim 15, wherein to determine one of the first transcoded stream and the second transcoded stream best suited for the client device, the processor is configured to determine which one of the first bit rate and the second bit rate is better suited for the bandwidth of the communication link.

17. The server of claim 12, wherein to determine one of the first node and the second node, the processor is configured to determine one of the first node and the second node based on geographical proximity of the respective one of the first node and the second node to the electronic device.

18. The server of claim 12, the processor being further configured to receive an indication of an updated operational parameter at a point of time after the transmitting of the connection signal.

19. The server of claim 18, responsive to the updated operational parameter indicating a need for bit rate change, the processor is further configured to transmit to the client device an updated connection signal, the updated connection signal including identification of a different one of the of the first transcoded stream and the second transcoded stream.

20. The server of claim 19, wherein the different one of the first transcoded stream and the second transcoded stream is associated with a lower bit rate than the one of the of the first transcoded stream and the second transcoded stream included in the connection signal.

21. The server of claim 19, wherein the different one of the first transcoded stream and the second transcoded stream is associated with a higher bit rate than the one of the of the first transcoded stream and the second transcoded stream included in the connection signal.

22. The server of claim 12, the processor is being further configured to implement forward error correction (FEC) after the transmitting.

* * * * *